United States Patent [19]

Bracht et al.

[11] Patent Number: 5,563,334
[45] Date of Patent: Oct. 8, 1996

[54] FILTER INTEGRITY TESTING IN CLEAN ROOMS AND THE LIKE

[75] Inventors: Karl Bracht, Goettingen; Ingo Gehne, Katlenburg-Berka, both of Germany

[73] Assignee: Sartorius AG, Germany

[21] Appl. No.: 420,240

[22] Filed: Apr. 11, 1995

[30] Foreign Application Priority Data

Apr. 15, 1994 [DE] Germany ............... 44 13 081.3

[51] Int. Cl.⁶ ............................................. B01D 65/10
[52] U.S. Cl. ................................................. 73/38; 342/350
[58] Field of Search ................................ 73/38; 342/350

[56] References Cited

U.S. PATENT DOCUMENTS

| | | | |
|---|---|---|---|
| 4,779,448 | 10/1988 | Gogins ........................... | 73/38 |
| 4,872,974 | 10/1989 | Hirayama et al. ............. | 210/90 |
| 4,881,176 | 11/1989 | Knonov ......................... | 364/500 |
| 4,949,362 | 8/1990 | Gaubatz ........................ | 376/259 |
| 4,995,916 | 2/1991 | Meikrantz et al. ............ | 134/22.16 |
| 5,056,066 | 9/1991 | Messenger .................... | 370/94.1 |
| 5,134,644 | 7/1992 | Garton et al. ................ | 379/39 |
| 5,288,434 | 2/1994 | Knapp ........................... | 342/350 |
| 5,371,623 | 12/1994 | Eastmond et al. ............ | 359/167 |
| 5,410,738 | 5/1995 | Diepstraten et al. ......... | 455/58.2 |
| 5,424,859 | 6/1995 | Uehara et al. ................ | 359/152 |
| 5,483,078 | 1/1996 | Hermann et al. .............. | 250/559.2 |

Primary Examiner—Hezron E. Williams
Assistant Examiner—Jay L. Politzer
Attorney, Agent, or Firm—Chernoff, Vilhauer, McClung & Stenzel

[57] ABSTRACT

There is disclosed a process and apparatus for testing the integrity of filter elements located in protected environments such as clean rooms and the like, principally characterized by wireless electromagnetic transmission of test data between the filter test apparatus located in the protected environment and data evaluation means located outside the protected environment. The process and apparatus are especially suitable for testing ultra- and micro-filtration filter elements.

2 Claims, 1 Drawing Sheet

FILTER INTEGRITY TESTING IN CLEAN ROOMS AND THE LIKE

BACKGROUND OF THE INVENTION

The invention is concerned with a process and apparatus for testing the integrity of filter elements which are located in protected environments, such as clean rooms, sterile rooms, explosion-proof rooms, and production areas for products in the areas of microelectronics, biotechnology, foodstuffs, pharmaceuticals, medicines and chemicals.

Testing the integrity of filter elements includes tests of pressure retention, diffusion rates, water intrusion, and the determination of bubble points. Filter elements to be tested include flat filters, hollow fiber filters, and tubes. The form of the filters include cartridges, capsules, and disposable and cassette modules, and may include hydrophobic and hydrophilic membranous filters or woven fleece-like fabric as used in the areas of ultrafiltration and microfiltration.

Conventional testing of the integrity of filter elements is often carried out with automatic test devices, which are joined to the filter elements and to a pressurized gas source. Such automatic test devices are commercially available, for example, from Sartorius AG of Goettingen, Germany as the "Sartocheck" tester. To test the integrity of a filter, one side of the filter is pressurized by a test gas at a designated test pressure. After stabilization, pressure changes are measured on either the pressurized or the unpressurized side of the filter over a predetermined time interval. From the values computed by the filter test equipment from the test data, a report is printed out detailing the status of the integrity of the filter, including a report on whether failure of the filter element is imminent.

When performing conventional integrity tests on filter elements in protected environments, the filter test equipment remains outside the room to avoid contamination. The pressure test line from the test device to the filter element goes through the wall or the ceiling of the room and is connected to the filter element at a point proximate the entry of the line through the wall or ceiling. When a test is to be done, a person inside the protected environment signals the operator of the filter test device outside the room, who conducts the test and then informs the person in the room whether or not the filter has passed the tests. However, this method requires considerable expense to install contamination-proof test lines through the wall or ceiling. A further drawback is that two persons are required, and miscommunications can and frequently do occur.

There is therefore a need in the art for a simplified, less expensive filter testing system that avoids the foregoing shortcomings. This need and others which will become apparent, are summarized and described in detail below.

SUMMARY OF THE INVENTION

The essence of the present invention lies in the provision of wireless transmission and receipt of signals between the filter test unit located in the protected environment and means for starting, observing and evaluating test data located outside of the protected environment. Because the filter test unit and module are located in the protected environment, they may be sterilized and are not subject to contamination or spurious gas or particle infiltration. The present invention further contains no components which can cause particulate emission or electrical discharges, making it especially suitable for use in "clean rooms" and explosion-proof rooms.

DETAILED DESCRIPTION OF PREFERRED EMBODIMENT

Figure 1:
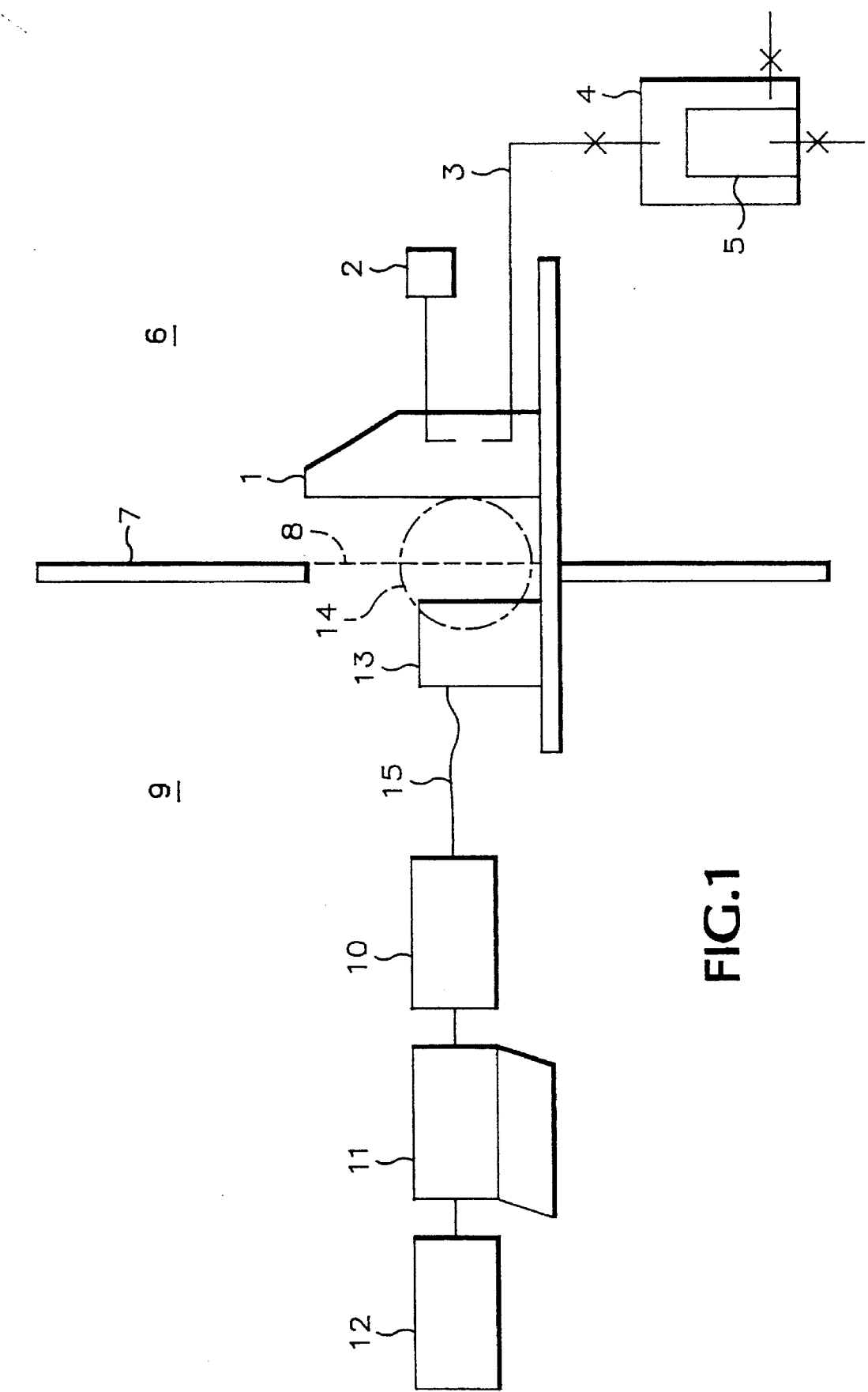
FIG. 1 is a schematic drawing showing the system and apparatus of the present invention.

In accordance with the present invention, and referring to FIG. 1, there is provided a filter test apparatus 1 served by a pressurized gas source 2, the apparatus 1 in turn being connected by conduit 3 to a filter module housing 4. Filter module housing 4 encloses the filter element 5 which is to be tested. Filter test apparatus 1, pressurized gas source 2, conduit 3, and filter module housing 4 together with filter element 5 are all located in a protected environment 6, such as would be encountered in clean rooms, sterile rooms or explosion-proof rooms. Protected environment 6 is separated from a second non-protected environment 9 by a wall 7 having a translucent window 8 therein. A data transmission interface 10 having either a receiver or a sending/receiving unit for wireless electromagnetic transmission of data is linked to a computer 11 and so positioned that wireless data exchange through window 8 with filter test apparatus 1 may occur. Attached to computer 11 is a printer 12 which prints out test reports.

Filter test apparatus 1 differs from conventional filter test units such as the Sartorius "Sartocheck" unit in that it is additionally equipped with a sending or sending/receiving unit for wireless data exchange and also possesses an inductively chargeable power supply unit (not shown). Furthermore, it may be equipped with a microprocessor that is capable of internally storing and evaluating test data that are generated. Inductive charger 13, which is needed to charge the power supply unit, remains outside room 6. Charging is effected by induction 14 (shown by dashed line circle) through window 8, and may be done upon demand when the power supply unit indicates a low charge of a predetermined value. Filter test apparatus 1 has no printer unit and, aside from the connection for conduit 3, it has no structural elements which penetrate the housing of the filter test equipment, such as switches. Thus, filter test apparatus 1 is sealed entirely from the environment outside the protected environment. It has no sources of particulate emission, nor is it subject to electrical spark discharge. It is readily sterilizable and, because its power supply is rechargeable upon demand, it may be characterized as self-sustaining. Moreover, since it requires no special plumbing, it can be readily installed in rooms with special requirements regarding cleanliness, sterility or explosion protection.

For carrying out integrity tests of filter element 5, filter test apparatus 1 is connected to pressurized gas source 2 and via conduit 3 to filter module housing 4. Filter test equipment 1 may be activated by a solenoid switch, and the desired test program may be entered, for example, by means of a keyboard.

The completion of the test may be signaled by a tone and the results of the test may be displayed on a video monitor or by a light signal. Measurement data and the results of the test may be evaluated and stored internally in filter test apparatus 1 by a microprocessor and then wirelessly transmitted, for instance, through an infrared signal 15 (shown schematically as a wavy line), through translucent window 8 to data transmission interface 10 for recordation by computer 11, and there either stored or printed out on printer 12. Alternatively, the test results may be sent back from the computer, via data transmission interface 10, to filter test apparatus 1 in order to be read as a light signal or a display readable by a person working in the protected environment.

The invention offers the advantage that integrity tests of filter elements can be carried out in clean rooms, sterile rooms, and explosion-proof rooms, with an automatically operating filter test apparatus without danger of contamination in the rooms by particulates or microorganisms from the ambient surroundings. Likewise gaseous contamination of the explosion-proof room by the environment is avoided. It is also an advantage that the testing process requires only one person for its execution.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for testing the integrity of at least one filter element in a protected environment having special cleanliness and safety requirements, comprising:

(a) a filter module located in said protected environment containing at least one filter element to be tested;

(b) a filter test unit located in said protected environment and coupled to said filter module, said filter test unit including a source of pressurized gas for testing filter elements and an optical data transmitter for transmitting filter test data;

(c) an inductively chargeable power supply for said filter test unit and an inductive charging unit located outside of said protected environment and inductively coupled to said power supply; and (d) a data receiver interface located outside of said protected environment for receiving filter test data from the filter test unit wherein said filter test unit and said data receiver interface are optically linked through an optically transmissive window separating said protected environment from an outside environment.

2. The apparatus of claim 1 wherein said inductively chargeable power supply emits a wireless demand signal when said power supply is low, said inductive charging unit responding to said signal to inductively charge said power supply.

* * * * *